US012586932B2

(12) United States Patent
Da Silveira et al.

(10) Patent No.: US 12,586,932 B2
(45) Date of Patent: Mar. 24, 2026

(54) PROXIMITY RF CONNECTOR (PRF)

(71) Applicant: Telefonaktiebolaget LM Ericsson (publ), Stockholm (SE)

(72) Inventors: Marthinus Willem Da Silveira, Ottawa (CA); Neil McGowan, Stittsville (CA); Francis Marion, Gatineau (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 389 days.

(21) Appl. No.: 18/246,218

(22) PCT Filed: Oct. 5, 2020

(86) PCT No.: PCT/IB2020/059347
§ 371 (c)(1),
(2) Date: Mar. 22, 2023

(87) PCT Pub. No.: WO2022/074425
PCT Pub. Date: Apr. 14, 2022

(65) Prior Publication Data
US 2023/0361812 A1 Nov. 9, 2023

(51) Int. Cl.
*H04B 5/00* (2024.01)
*H01R 4/48* (2006.01)
(Continued)

(52) U.S. Cl.
CPC .......... *H01R 4/4809* (2013.01); *H01R 12/57* (2013.01); *H04B 5/22* (2024.01); *H01R 2201/02* (2013.01); *H04B 5/40* (2024.01)

(58) Field of Classification Search
CPC .......... H04B 5/22; H04B 5/72; H01R 4/4809; H01R 12/57; H01R 2201/02
See application file for complete search history.

(56) References Cited

U.S. PATENT DOCUMENTS

2010/0321325 A1* 12/2010 Springer ................ H01Q 1/243
345/173
2013/0120210 A1* 5/2013 Zeiger .................... H01Q 9/045
343/841
(Continued)

FOREIGN PATENT DOCUMENTS

CN 202423770 U 9/2012
CN 103367864 A 10/2013
(Continued)

OTHER PUBLICATIONS

Invitation to Pay Additional Fees and, Where Applicable, Protest Fee dated Jun. 15, 2021 issued in PCT Application No. PCT/IB2020/059347 filed Oct. 5, 2020, consisting of 17 pages.
(Continued)

*Primary Examiner* — Ping Y Hsieh
(74) *Attorney, Agent, or Firm* — Sonoda & Kobayashi Intellectual Property Law; Darren M. Gardner

(57) ABSTRACT

According to one or more embodiments, a proximity radio frequency connector for electromagnetically coupling a first circuit board with a second circuit board is provided. The proximity radio frequency connector includes: a housing defining an exterior mounting surface and an interior void opposite the exterior mounting surface where the housing is mountable to the second circuit board and the housing is movable in a direction at least one of perpendicular and tangential to the second circuit board, a proximity circuit board mountable to the exterior mounting surface of the housing, and a coupling first transmission line for electromagnetically coupling a signal to the first circuit board when the first circuit board is proximate the proximity circuitry board.

34 Claims, 15 Drawing Sheets

(51) Int. Cl.
    *H01R 12/57*     (2011.01)
    *H04B 5/22*     (2024.01)
    *H04B 5/40*     (2024.01)

(56)              References Cited

U.S. PATENT DOCUMENTS

| | | | |
|---|---|---|---|
| 2014/0302888 A1* | 10/2014 | Syal .................... | H04M 1/0256 |
| | | | 455/552.1 |
| 2017/0331230 A1 | 11/2017 | Bayer et al. | |
| 2021/0067204 A1* | 3/2021 | Asai ......................... | H04B 5/22 |

FOREIGN PATENT DOCUMENTS

| | | | | |
|---|---|---|---|---|
| CN | 104752929 | A | | 7/2015 |
| CN | 106332515 | A | | 1/2017 |
| CN | 208572082 | U | * | 3/2019 |
| CN | 209045783 | U | | 6/2019 |
| CN | 11070707424 | A | | 1/2020 |

OTHER PUBLICATIONS

International Search Report and Written Opinion dated Jul. 27, 2021 issued in PCT Application No. PCT/IB2020/059347 filed Oct. 5, 2020, consisting of 29 pages.
Chinese Office Action dated Oct. 28, 2024 and English summary translation of the Chinese Office Action issued in corresponding Chinese Application No. 202080105852.0, consisting of 16 pages.
Chinese Notice of Allowance dated Apr. 15, 2025 and machine English translation of the Chinese Notice of Allowance issued in corresponding Chinese Application No. 202080105852.0, consisting of 8 pages.

\* cited by examiner

PROXIMITY RF CONNECTOR (PRF)

CROSS-REFERENCE TO RELATED APPLICATION

This application is a Submission Under 35 U.S.C. § 371 for U.S. National Stage Patent Application of International Application Number: PCT/IB2020/059347, filed Oct. 5, 2020 entitled "PROXIMITY RF CONNECTOR (PRF)," the entirety of which is incorporated herein by reference.

TECHNICAL FIELD

A radio frequency (RF) connector for a wireless communication system and in particular, to a proximity RF connector (PRF) for the wireless communication system.

BACKGROUND

Some wireless communication systems employ advanced antenna system (AAS) among other antenna configurations that rely on connection(s) between antennas and filters output ports. These connections are typically provided by cables and connector, and more recently with blind mate connectors with bullets (such as MBX, efficient board connector (EBC) or sub-miniature push-on (SMP) connectors).

These cables/connectors allow for the antenna to be separable from the radio/filter in case of issues with the filter or antenna. However, cables and connectors may be required to be small in AAS solutions with many sub-arrays and transceivers. These small connectors and cables can cause passive intermodulation (PIM) that is a non-linear effect that causes distortion in the signals, which may reduce network reliability, data rate, capacity, etc., in wireless device systems such as in Frequency Division Duplex (FDD) AAS systems.

SUMMARY

Some embodiments advantageously provide a proximity radio frequency connector. In particular, connection(s) between the antenna and filter is provided by a combination of broadside coupled transmission lines for the signal and capacitive coupling for the ground with a flexible transmission line to allow for mechanical tolerances and also allows for the antenna and filter to be separated from each other. In one or more embodiments, a proximity radio frequency (RF) connector uses a coupled connection or non-metallic contact between the antenna and filter such that there is no physical connection between the antenna and filter, i.e., closely spaced but no physical/mechanical metal connection for communicating signals from the filter to the antenna such that there may be physical contact but there is a thin dielectric layer separating metal from the filter side and metal from the antenna side so that there is no metal to metal contact.

According to one aspect of the disclosure, a proximity radio frequency connector for electromagnetically coupling a first circuit board with a second circuit board is provided. The proximity radio frequency connector includes a housing defining an exterior mounting surface and an interior void opposite the exterior mounting surface. The housing is mountable to the second proximity circuit board where the housing is movable in a direction at least one of perpendicular and tangential to the second circuit board. The proximity radio frequency connector includes a proximity circuit board mountable to the exterior mounting surface of the housing where the proximity circuit board includes a coupling first transmission line for electromagnetically coupling a signal to the first circuit board when the first circuit board is proximate the proximity circuitry board.

According to one or more embodiments of this aspect, the proximity radio frequency connector includes a second transmission line positioned in the interior void, the second transmission line being configured to electrically connect the second circuit board to the proximity circuit board. According to one or more embodiments of this aspect, the second transmission line is a flexible transmission line that is configured to flex in response to movement of the housing. According to one or more embodiments of this aspect, the flexible transmission line is suspended within the interior void at least in part by physically connecting the flexible transmission line to the proximity circuit board and the second circuit board.

According to one or more embodiments of this aspect, the flexible transmission line comprises a signal conductor and a ground conductor. According to one or more embodiments of this aspect, the proximity radio frequency connector includes a dielectric positioned between the signal conductor and the ground conductor. According to one or more embodiments of this aspect, the proximity radio frequency connector includes a spring mechanism configured to bias the housing in the direction at least one of perpendicular and tangential to the proximity circuit board. According to one or more embodiments of this aspect, the spring mechanism includes at least one leaf spring.

According to one or more embodiments of this aspect, the spring mechanism includes a plurality of spring clips that are configured to keep the spring mechanism under tension before the housing is removably pressed to the first circuit board. According to one or more embodiments of this aspect, the proximity circuit board is configured to be removably pressed against the first circuit board by the spring mechanism. According to one or more embodiments of this aspect, the housing includes at least one housing alignment element that is mateable with at least one alignment element of the first circuit board where the housing alignment element configured to position a coupling first transmission line of the proximity circuit board in a predefined orientation with respect to a third transmission line on the first circuit board. According to one or more embodiments of this aspect, the second circuit board is a filter circuit board and the first circuit board is an antenna circuit board.

According to another aspect of the disclosure, a proximity radio frequency connector for electrically connecting a filter circuit board to an antenna circuit board of a network node is provided. The proximity radio frequency connector includes a housing defining an exterior mounting surface and an interior void opposite the exterior mounting surface where the housing is mountable to the filter circuit board movable in a direction at least one of perpendicular and tangential to the filter circuit board. The proximity radio frequency connector includes a proximity circuit board mountable to the exterior mounting surface of the housing where the proximity circuit board includes a coupling first transmission line for electromagnetically coupling a signal to the antenna circuit board when the antenna circuit board is proximate the proximity circuit board.

According to one or more embodiments of this aspect, the proximity radio frequency connector includes a second transmission line positioned in the interior void where the second transmission line is configured to electrically connect the filter circuit board to the proximity circuit board. According to one or more embodiments of this aspect, the second transmission line is a flexible transmission line that is configured to flex in response to movement of the housing. According to one or more embodiments of this aspect, the flexible transmission line is suspended within the interior void at least in part by physically connecting the flexible transmission line to the proximity circuit board and the filter circuit board.

According to one or more embodiments of this aspect, the flexible transmission line comprises a signal conductor, a ground conductor and a dielectric where the dielectric is positioned between the signal conductor and the ground conductor. According to one or more embodiments of this aspect, the proximity radio frequency connector includes a spring mechanism configured to bias the housing in the direction at least one of perpendicular and tangential to the proximity circuit board. According to one or more embodiments of this aspect, the spring mechanism includes at least one leaf spring. According to one or more embodiments of this aspect, the spring mechanism includes a plurality of spring clips that are configured to keep the spring mechanism under tension before the housing is removably pressed to the antenna circuit board.

According to one or more embodiments of this aspect, the proximity circuit board is configured to be removably pressed against the antenna circuit board by the spring mechanism. According to one or more embodiments of this aspect, the housing includes at least one housing alignment element that is mateable with at least one alignment element of the antenna circuit board where the housing alignment element is configured to position the coupling first transmission line of the proximity circuit board in a predefined orientation with respect to a third transmission line on the antenna circuit board.

According to another aspect of the disclosure, a proximity radio frequency connector for electromagnetically coupling a first circuit board with a second circuit board of an antenna system is provided. The proximity radio frequency connector includes a flexible transmission line at least partially suspended at least in part by a spring mechanism where the flexible transmission line is configured to electrically connect a first circuit board to the second circuit board. The proximity radio frequency connector further includes a first proximity circuit board including a first coupling transmission line for electromagnetically coupling a signal to the first circuit board when the first proximity circuit board is proximate the first circuit board.

According to one or more embodiments of this aspect, the spring mechanism is configured to bias the first proximity circuit board in a direction perpendicular to the first proximity circuit board. According to one or more embodiments of this aspect, the proximity radio frequency connector includes a second proximity circuitry board including a second coupling transmission line for electromagnetically coupling the signal from the second circuit board when the second proximity circuit board is proximate the second circuit board.

According to one or more embodiments of this aspect, the proximity radio frequency connector includes a housing that defines an exterior mounting surface and an interior void opposite the exterior mounting surface where the housing is mountable to a second circuit board, and where the housing is movable in a direction at least one of perpendicular and tangential to the second circuit board. The first proximity circuit board mountable to the exterior mounting surface of the housing. The flexible transmission line is suspended within the interior void at least in part by physically connecting the flexible transmission line to the first proximity circuit board and the second circuit board. According to one or more embodiments of this aspect, the flexible transmission line is configured to flex in response to movement of the housing. According to one or more embodiments of this aspect, the proximity radio frequency connector includes a spring mechanism configured to bias the housing in the direction at least one of perpendicular and tangential to the first proximity circuit board.

According to one or more embodiments of this aspect, the spring mechanism includes at least one leaf spring. According to one or more embodiments of this aspect, the spring mechanism includes a plurality of spring clips that are configured to keep the spring mechanism under tension before the housing is removably pressed to the first circuit board. According to one or more embodiments of this aspect, the first proximity circuit board is configured to be removably pressed against the first circuit board by the spring mechanism.

According to one or more embodiments of this aspect, the housing includes at least one housing alignment element that is mateable with at least one alignment element of the first circuit board where the housing alignment element is configured to position a coupling transmission line of the first proximity circuit board in a predefined orientation with respect to a second transmission line on the first circuit board. According to one or more embodiments of this aspect, the second circuit board is a filter circuit board and the first circuit board is an antenna circuit board. According to one or more embodiments of this aspect, the flexible transmission line comprises a signal conductor, a ground conductor and a dielectric, the dielectric being positioned between the signal conductor and the ground conductor.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
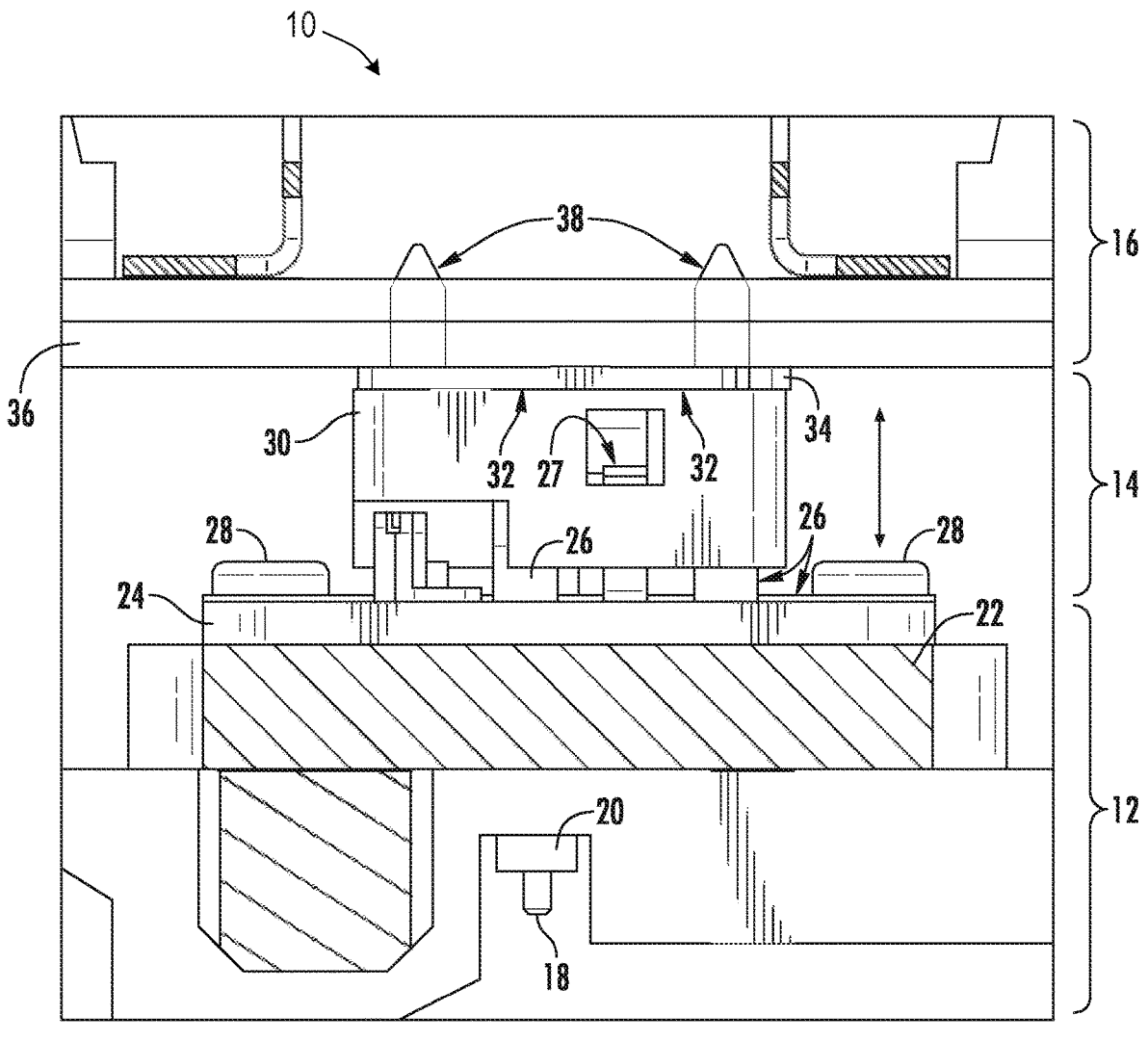
FIG. 1 is a cross-section view of a portion of an antenna system according to the principles of the disclosure.

Before describing in detail exemplary embodiments, it is noted that the embodiments reside primarily in combinations of apparatus components related to a proximity radio frequency (RF) connector (PRF). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As may be used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

Note that although one or more embodiments described herein may be applicable to a particular wireless system, such as, for example, 3GPP LTE based system and/or New Radio (NR) bases system, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB), Global System for Mobile Communications (GSM), etc., may also benefit from exploiting the ideas covered within this disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for a proximity RF connector (PRF) for the wireless communication system. In particular, the proximity RF connector described herein advantageously provides one or more of: very low PIM, allows for mechanical tolerance between the antenna, filter and other radio components, blind mate separable interface, and short overall length/dimension(s).

Referring now to drawing figures, in which like elements are referred to by like reference numerals, there is shown in FIG. 1 a cross-sectional view of a portion of antenna system 10 (system 10). In one or more embodiments, antenna system 10 may be part of a network node. System 10 includes a filter portion 12, proximity RF connector 14 and an antenna portion 16 (not shown). Filter portion 12 generally provides signal filtering/processing capabilities where signal pin 18 receives one or more signals for filtering and eventual transmission via antenna portion 16. In one or more embodiments, signal pin 18 is positioned within TEFLON cylinder 20. In one or more embodiments, signal pin 18 and the TEFLON cylinder 20 form a 50 ohm impedance coaxial transmission line for insertion into a cylindrical hole in filter circuit board 24. Filter portion 12 includes connector ground mounting surface 22 on which filter circuit board 24 may be mounted. In one or more embodiments, the signal trace/transmission line of filter circuit board 24 may be soldered to coaxial signal pin 18 where the transmission line of filter circuit board 24 may be connected to flexible transmission line (not show), as described herein. Filter circuit board 24 may provide one or more output filtered/processed signals to proximity RF connector 14. In one or more embodiments, the filter circuit board 24 may be a filter output printed circuit board (PCB).

Proximity RF connector 14 may include one or more spring mechanisms 26 (collectively referred to as spring mechanism 26) that may be mounted and/or removably affixed to filter circuit board 24 by one or more mounting screws 28. Spring mechanism 26 is configured to bias housing 30 in a direction at least one of perpendicular and tangential to filter circuit board 24 and/or another circuit board discussed herein. Spring mechanism 26 may include one or more leaf spring clips 27, which are removably affixed to filter circuit board 24 via one or more mounting screws 28, that are configured to keep the spring mechanism 26 under tension before the housing 30 is removably pressed to antenna portion 16. For example, proximity circuitry board 34 (i.e., a moving part/element of proximity RF connector 14) and housing 30 (i.e., another moving part/element of proximity RF connector 14) may be pushed flat to the antenna circuit board 36 by spring mechanism 26 (e.g., leaf spring, spring bronze leaf spring, etc.). In one example, spring mechanism 26 allows for movement perpendicular to filter circuit board 24 of 0.75 mm or approximately 0.75 mm. In one example, spring mechanism 26 allows movement of housing 30 and proximity circuit board 24 in all directions (x-axis, y-axis, z-axis) in 3D space.

In one or more embodiments, the leaf spring clips 27 may hold the moving or movable parts (i.e., housing 30, proximity circuit board 34) in a nominal position prior to installation using the proximity RF connector 14. In one or more embodiments, mounting screws 28 may be plastic or non-metal screws, although other attachment mechanisms/fixation components may be used in accordance with the teachings of the disclosure. In one or more embodiments, spring mechanism 26 is made of a non-metal material and/or spring bronze, etc.

In one or more embodiments, housing 30 defines an exterior mounting surface 32 and an interior void (not shown) opposite the exterior mounting surface 32. Proximity RF connector 14 further includes proximity circuit board 34 that is mountable to the exterior mounting surface 32 of housing 30. Proximity circuit board 34 includes a coupling transmission line (not shown) for electromagnetically coupling a signal to the antenna circuit board 36 when the antenna circuit board 36 is at least one of proximate and tangential the proximity circuit board 34. In one or more embodiments a solder mask (not shown) may be deposited and/or positioned between antenna circuit board 36 and proximity circuit board 34 such as to physical separate these two boards. Further, housing 30 includes one or more housing alignment elements 38 that are mateable with at least one alignment element of antenna circuit board 36 such that housing alignment element 38 positions a coupling transmission line of the proximity circuit board 34 in a predefined orientation with respect to a transmission line (not shown) of the antenna circuit board 36 such that proximity RF connector 14, of system 10 electromagnetically couples the signal to the antenna portion 16 for transmission. For example, housing alignment elements 38 may be pins or pin shaped that are configured to align housing 30 and proximity circuit board 34 with the antenna circuit board 36. In one or more embodiments, housing 30 and housing alignment elements 38 that are part of housing 30 are made from a plastic material. Further, although one or more embodiments described herein refer to one or more circuit boards, one or more of the circuit boards may be replaced with a mechanical arrangement of metal conductors and non-metal insulating dielectric parts that are configured to provide the communication functionality of the one or more circuit boards.

Figure 2:
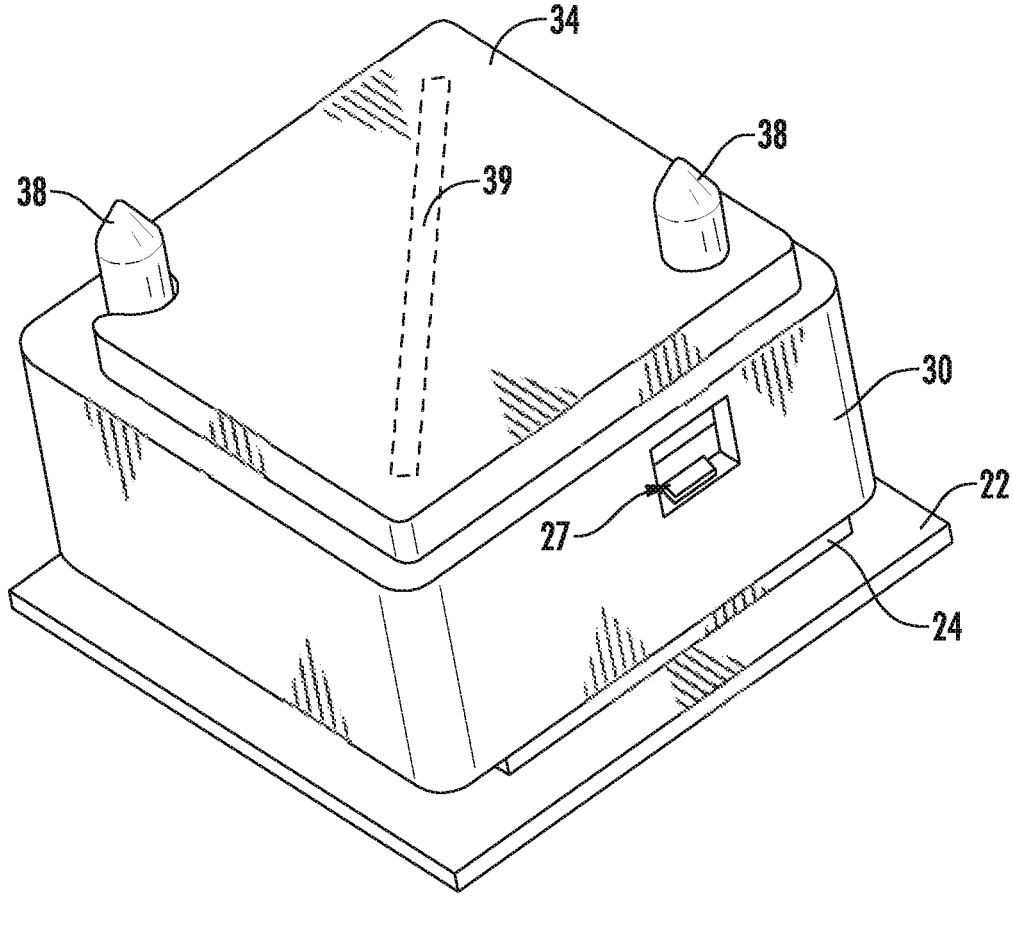
FIG. 2 is a perspective view of a proximity RF connector according to the principles of the disclosure.

FIG. 2 is a perspective view of proximity RF connector 14 according to the principles of the disclosure. In particular, proximity circuitry board 34 includes coupling transmission line 39 for coupling electromagnetic energy or signal(s) to a coupling transmission line of antenna circuit board 36. In particular, proximity RF connector 14 has a blind mate separable interface (i.e., side of proximity circuitry board 34 that is in physical contact with antenna portion). In one or more embodiments, the size of the blind mate separable interface may be 20 mm×20 mm, which is a size configured for a center frequency of 2 Ghz. However, other sizes and/or center frequencies and/or frequency bands may be configured in accordance with the principles of the disclosure.

Figure 3:
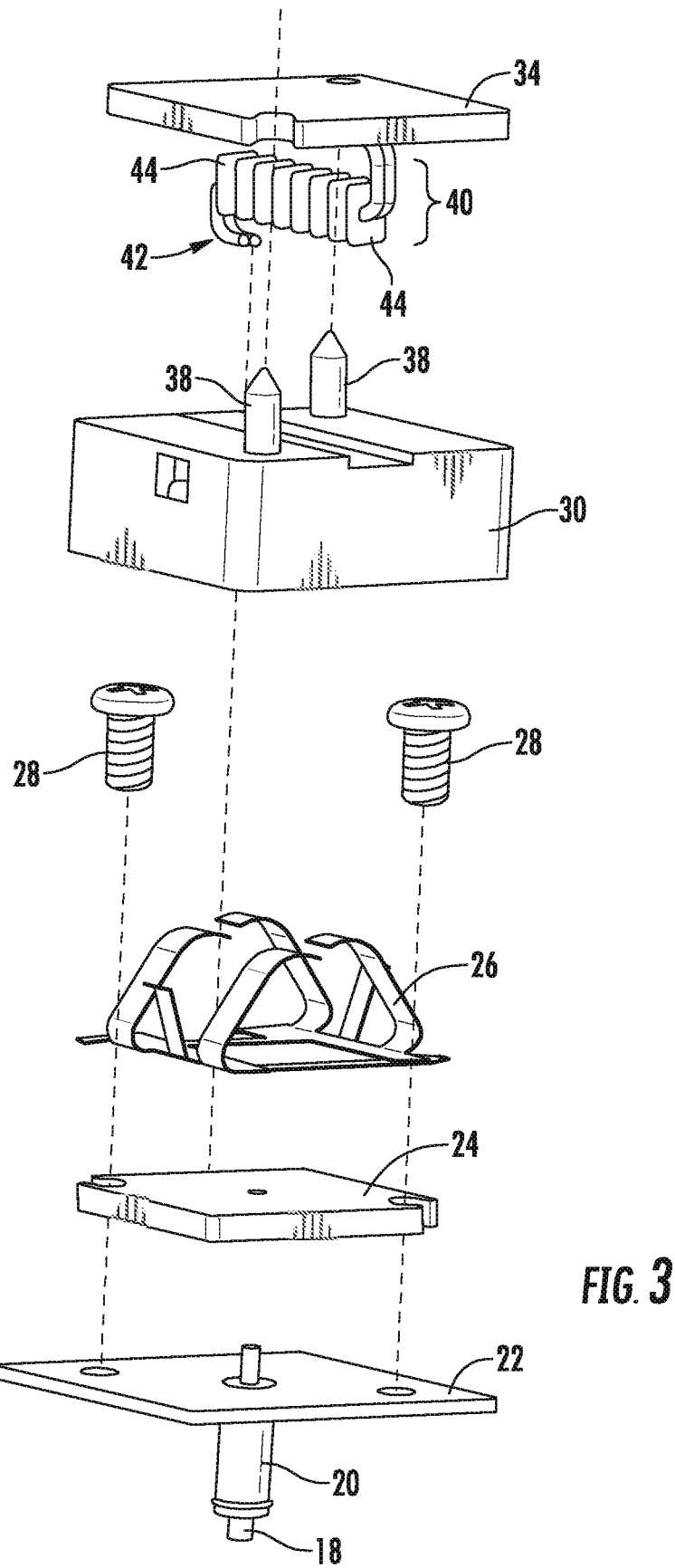
FIG. 3 is an exploded view of an example proximity RF connector and filter portion according to the principles of the disclosure.

FIG. 3 is an exploded view of an example proximity RF connector 14 and filter portion 12 according to the principles of the disclosure. Proximity RF connector 14 includes one or more flexible transmission lines 40 that may include one or more ground conductors and one or more signal conductors (collectively referred to as conductors 42). One or more impedance elements 44 may be used to provide impedance matching and/or impedance for the flexible transmission line 40 for a frequency range. In one or more embodiments, impedance element 44 is an over-molding and/or flexible PCBs. In one or more embodiments, flexible transmission line 40 may be formed from one or more of over-molded spring bronze, flexible PCB and the like.

In particular, proximity RF connector 14 may be comprised of parts that are fixed or movable after assembly or mounting of proximity RF connector 14 to filter portion 12. For example, the top part of proximity RF connector 14 is the proximity circuit board 34 that is a moving or movable part/component that includes a signal trace/transmission line 39 that is broadside coupled to antenna circuit board 36 as well as an electrical ground that is capacitively coupled to an electrical ground of antenna circuit board 36. The antenna circuit board 36 and proximity circuit board 34 are physically separated by a solder mask (not shown). Further, proximity circuit board 34 ground and signal trace are connected to filter circuit board 24 via the flexible transmission line 40.

By implementing a proximity coupling via one or more proximity circuit boards 34, the example of FIG. 3 allows for very low PIM generation compared to existing RF connection mechanisms that are separable. That is, while soldering of all electrical components in existing antenna to filter connection mechanisms may provide very low PIM generation, such soldering prevents the antenna portion 16 from being separated from the radio/filter portion 12 in cases where troubleshooting must be performed. On the other hand, existing RF connectors that allow for the antenna portion 16 to be separated from the filter portion 12 suffer from higher PIM generation. Hence, the example of FIG. 3 and others described herein advantageously allow for very low PIM generation that is at least comparable to the full soldering solution described above, while still providing the flexibility to be able to separate the antenna portion 16 from the filter portion 12 where troubleshooting issues is needed and/or to compensate/allow for variances in manufacturing (i.e., one or more of the flexible transmission line 40, housing alignment elements 38 and spring mechanism 26 allow for mechanical three-dimensional tolerances between the antenna portion 16, filter portion 12 and other radio components of system 10).

Figure 4:
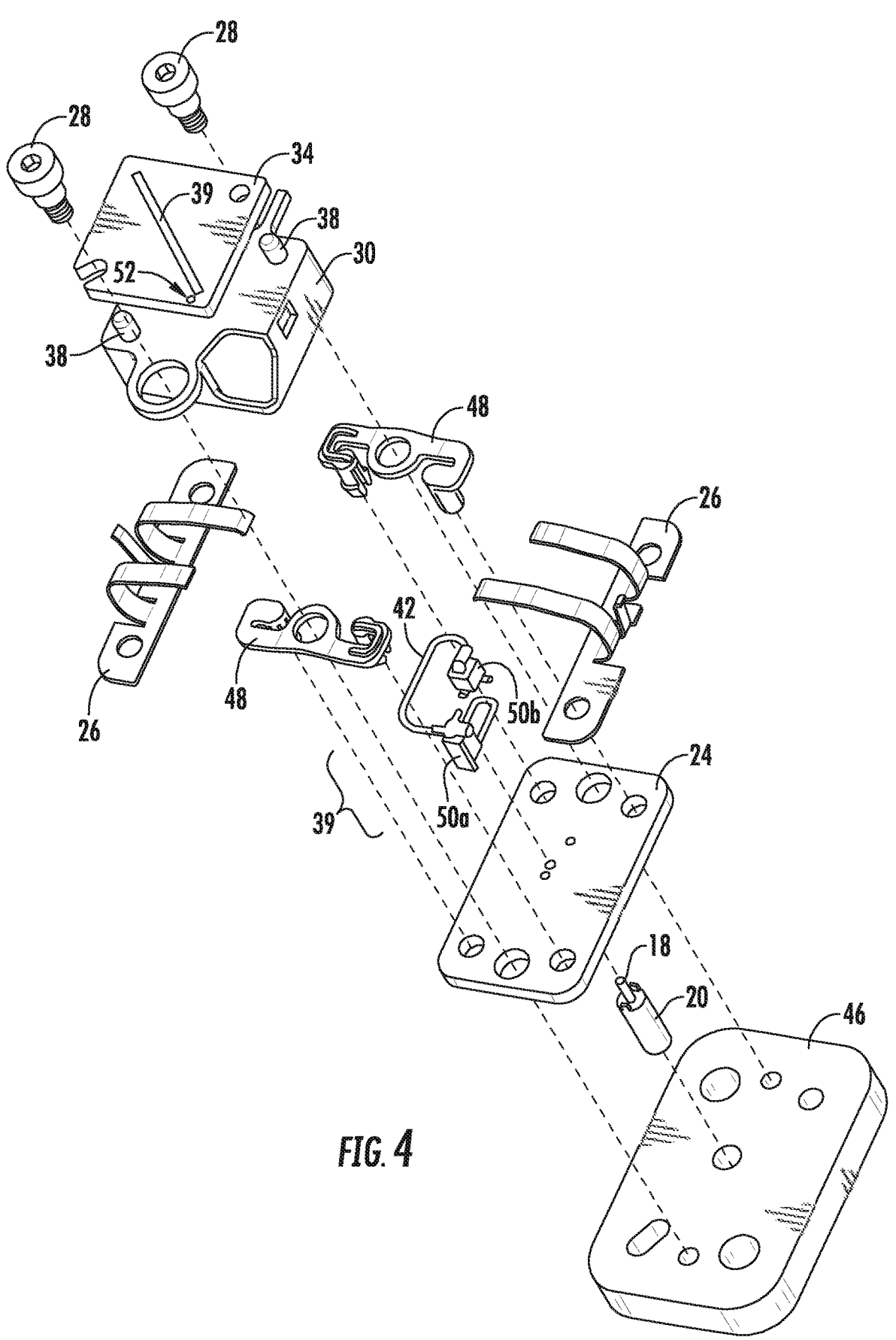
FIG. 4 is an exploded view of another example proximity RF connector and filter portion according to the principles of the disclosure.

FIG. 4 is an exploded view of another example proximity RF connector 14 and filter portion 12 according to the principles of the disclosure. While like reference designators generally refer to the same element, the example in FIG. 4 has some specific design differences. Starting from the filter portion 12, a top part of a filter that performs processing/filtering functions is illustrated for reference purposes. Spring mechanism 26 is provided by separate leaf springs where one or more fixation clips 48 may be used to affix spring mechanism 26 to filter circuit board 24. Further, flexible transmission line 39 may be provided by a flexible PCB and over-molded conductors 42. In one or more embodiments, one end of flexible transmission line 39 is soldered to a connection element 50b for physical and electrical connection to filter circuit board 24 while the other end of flexible transmission line 39 is soldered to another connection element 50a for electrical connection and physical connection to proximity circuit board 34, where flexible transmission line 40 is configured to flex in response to movement to housing 30, thereby allowing movement of housing 30 while maintaining the electrical and physical connections. The soldering of one or more of: signal pin 18 to filter circuit board 24, the ends of flexible transmission line 39, and proximity circuit board 34 may be performed during assembly. In one or more embodiments, the solder is Ag/Tin soldering. In one example, connection element 50a is mated with a portion of proximity circuit board 34 such that a portion of connection element 50 is solderable at soldering location 52. Therefore, once assembled and affixed to the top part of filter 46 by mounting screws 28 or other fixation element, filter circuit board 24 may be considered a fixed part relative to the top part of the filter 46 while the housing 30 and proximity circuit board 34 are considered moving parts relative to the top part of the filter 46. However, in one or more embodiments, the soldered connection between filter circuit board 24 and proximity RF connector 14 may be replaced with the proximity circuit board 34 based coupled connection such that proximity RF connector 14 includes two or more proximity circuit boards 34 to provide two or more instances of electromagnetically coupling a signal.

Figure 5:
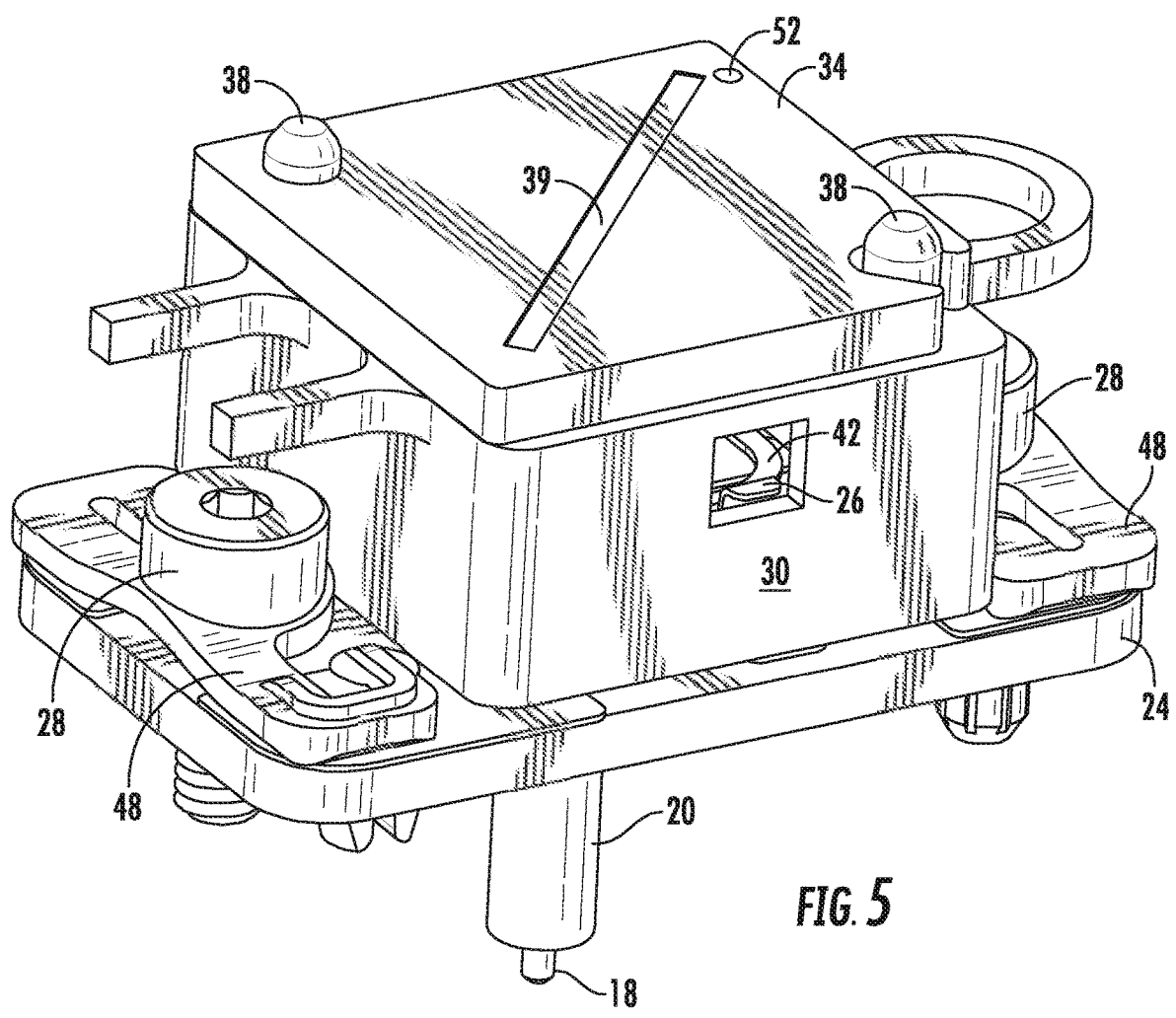
FIG. 5 is a perspective view of a proximity RF connector and filter portion where proximity RF connector is affixed to filter portion, according to the principles of the disclosure.

FIG. 5 is a perspective view of proximity RF connector 14 and filter portion 12 where proximity RF connector 14 is affixed to filter portion 12, according to the principles of the disclosure.

Figure 6:
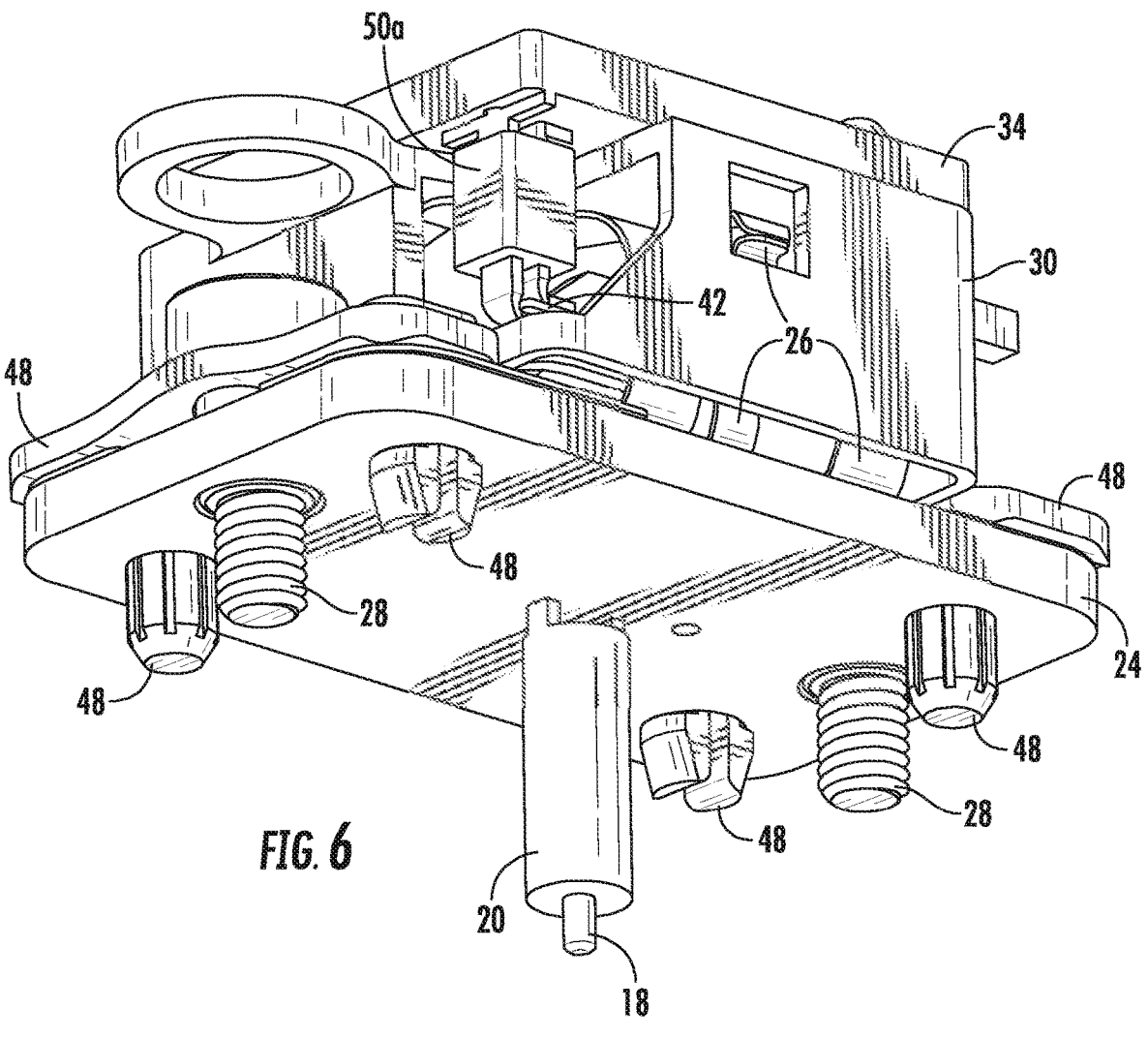
FIG. 6 is another perspective view of a proximity RF connector and filter portion where proximity RF connector is affixed to filter portion, according to the principles of the disclosure.

FIG. 6 is another perspective view of proximity RF connector 14 and filter portion 12 where proximity RF connector 14 is affixed to filter portion 12, according to the principles of the disclosure. In particular, connection element 50a is illustrated being affixed to proximity circuit board 34 at a via soldering location 52.

Figure 7:
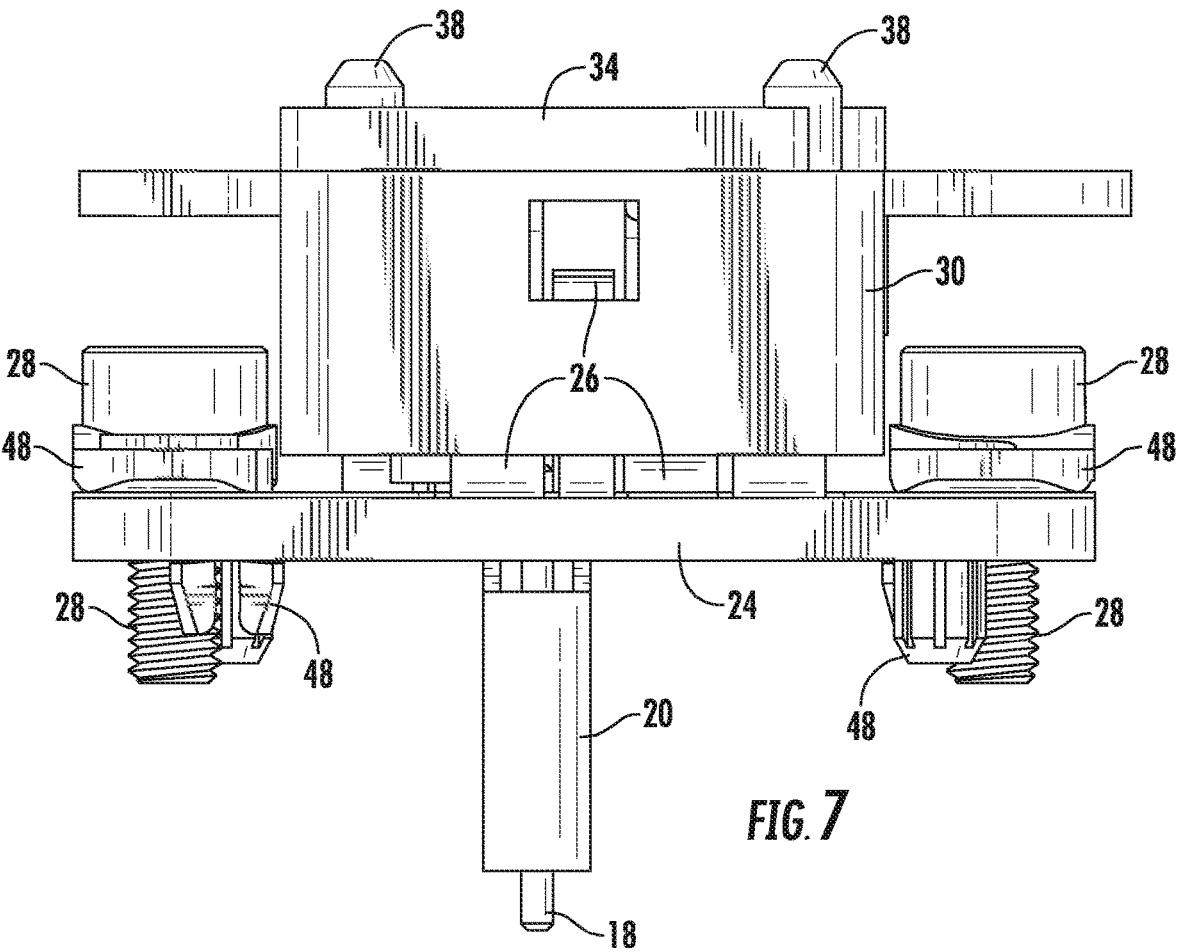
FIG. 7 is a front side view of a proximity RF connector and filter portion where proximity RF connector is affixed to filter portion, according to the principles of the disclosure.

FIG. 7 is a front side view of proximity RF connector 14 and filter portion 12 where proximity RF connector 14 is affixed to filter portion 12, according to the principles of the disclosure.

Figure 8:
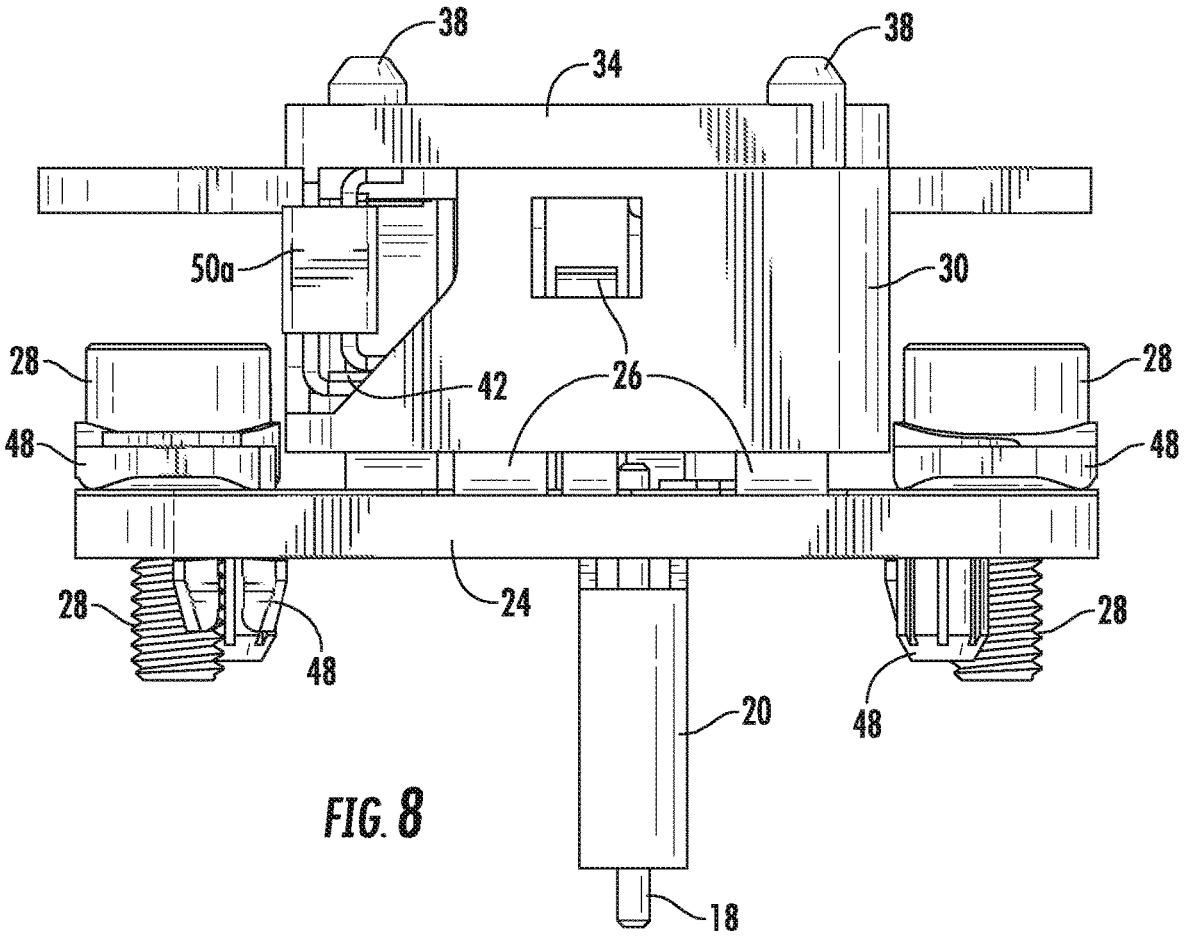
FIG. 8 is a back side view of a proximity RF connector and filter portion where proximity RF connector is affixed to filter portion, according to the principles of the disclosure.

FIG. 8 is a back side view of proximity RF connector 14 and filter portion 12 where proximity RF connector 14 is affixed to filter portion 12, according to the principles of the disclosure.

Figure 9:
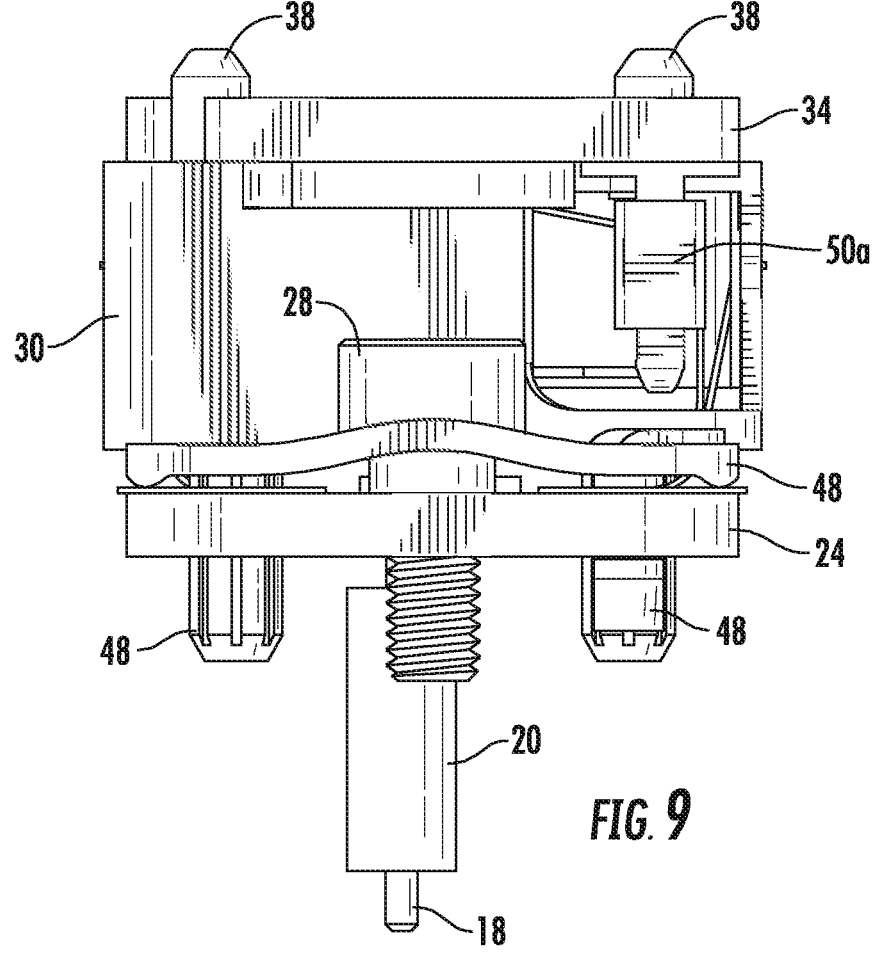
FIG. 9 is a right side view of a proximity RF connector and filter portion where proximity RF connector is affixed to filter portion, according to the principles of the disclosure.

FIG. 9 is a right side view of proximity RF connector 14 and filter portion 12 where proximity RF connector 14 is affixed to filter portion 12, according to the principles of the disclosure.

Figure 10:
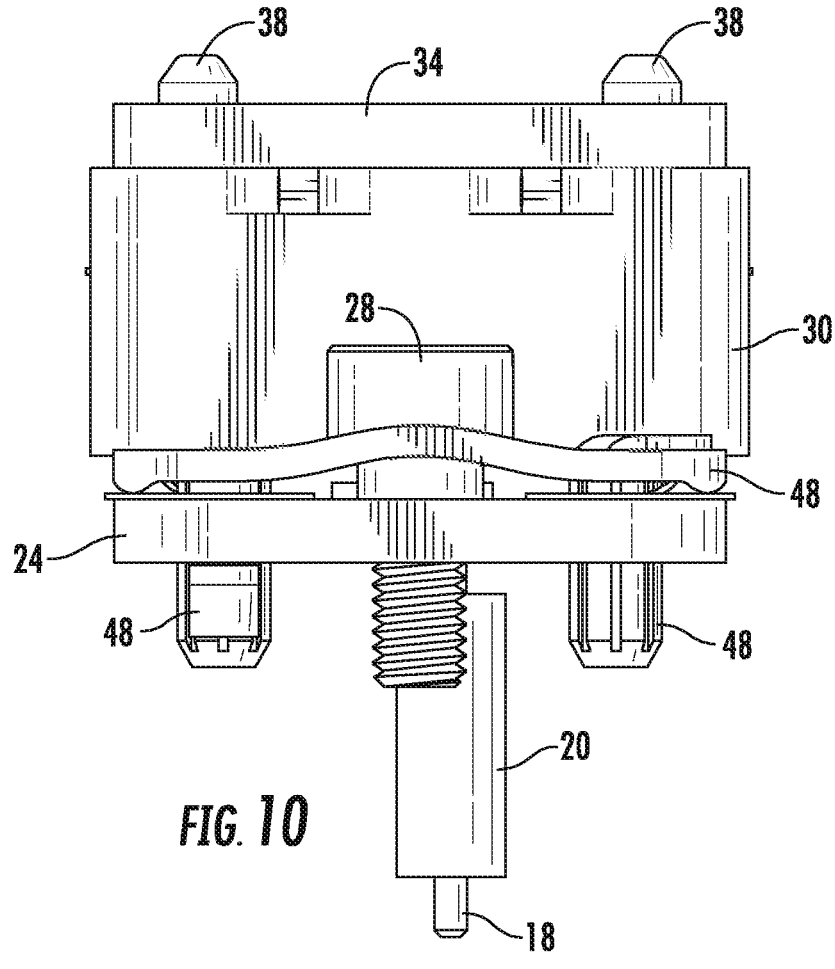
FIG. 10 is a left side view of a proximity RF connector and filter portion where proximity RF connector is affixed to filter portion, according to the principles of the disclosure.

FIG. 10 is a left side view of proximity RF connector 14 and filter portion 12 where proximity RF connector 14 is affixed to filter portion 12, according to the principles of the disclosure.

Figure 11:
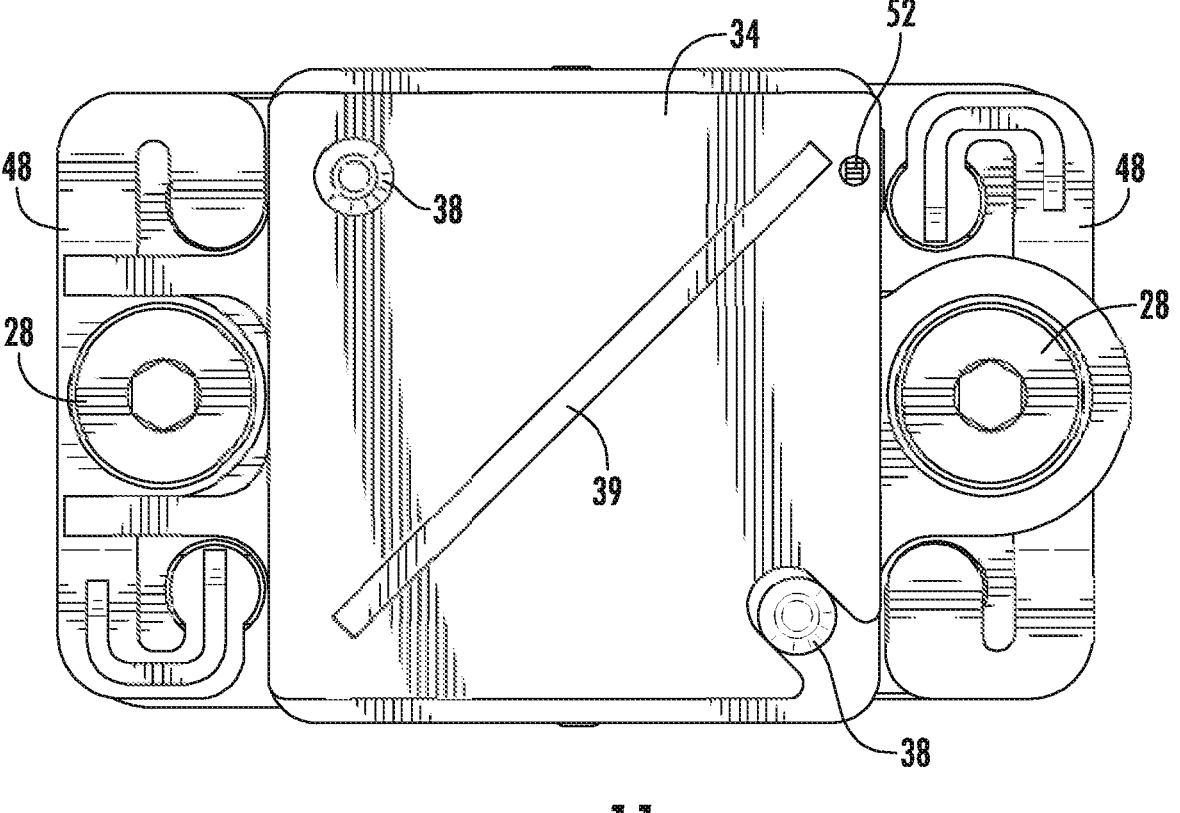
FIG. 11 is a top side view of a proximity RF connector and filter portion where proximity RF connector is affixed to filter portion, according to the principles of the disclosure.

FIG. 11 is a top side view of proximity RF connector 14 and filter portion 12 where proximity RF connector 14 is affixed to filter portion 12, according to the principles of the disclosure.

Figure 12:
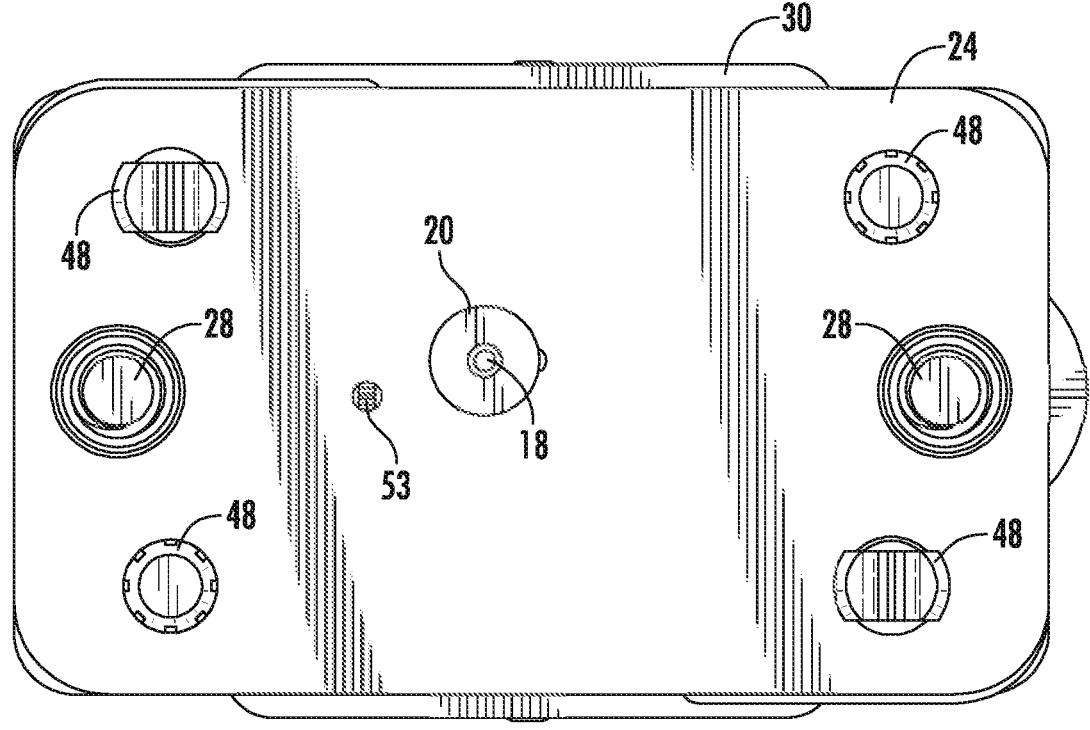
FIG. 12 is a bottom side view of a proximity RF connector and filter portion where proximity RF connector is affixed to filter portion, according to the principles of the disclosure.

FIG. 12 is a bottom side view of proximity RF connector 14 and filter portion 12 where proximity RF connector 14 is affixed to filter portion 12, according to the principles of the disclosure. In particular, filter circuit board 24 includes soldering location 53 that may be defined at least in part by a hole or via through which a portion of connection element 50b may be inserted such as to allow connection element 50b to be soldered to filter circuit board 24.

Figure 13:
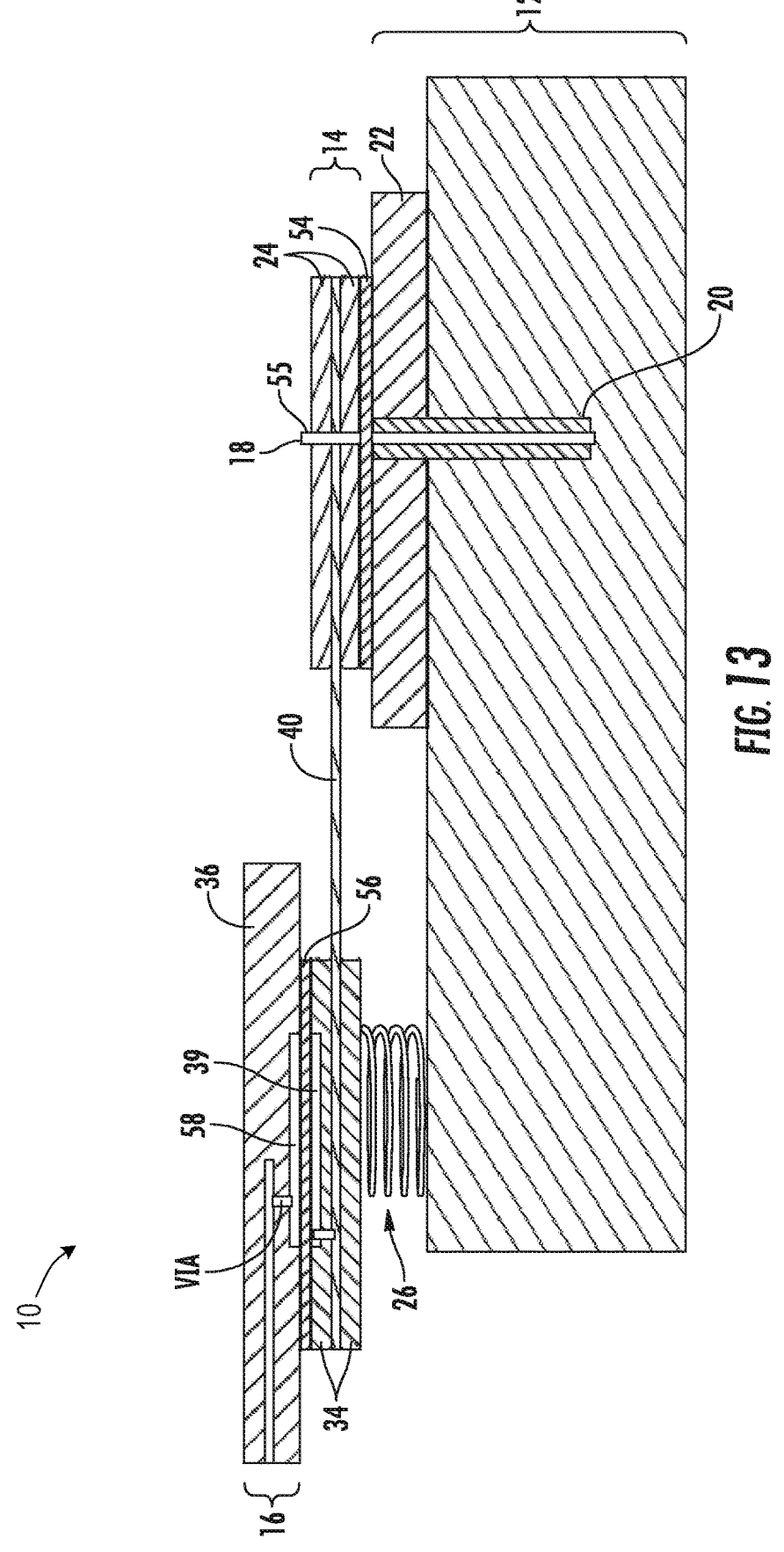
FIG. 13 is a cross-sectional view of another example of a portion of the system according to the principles of the disclosure.

FIG. 13 is a cross-sectional view of another example of a portion of antenna system 10, according to the principles of the disclosure. System 10 includes a filter portion 12, proximity RF connector 14 and an antenna portion 16. Filter portion 12 includes a connector ground mounting surface 22 and solder mask 54 that is positioned on the connector ground mounting surface 22. Filter circuit board 24 is positioned on or mounted on the solder mask 54 where signal pin 18 is inserted through filter circuit board 24 similar to the example of FIG. 3. However, filter circuit board 24 is now configured to sandwich a portion of flexible transmission line 40 (i.e., sandwich one end of flexible transmission line 40) where the remaining portion of flexible transmission line 40 extends past the filter circuit board 24 as illustrated in FIG. 13. Signal pin 18 may be soldered at soldering location 55, which may at least in part secure filter circuit board 24 and/or a sandwiched portion of flexible transmission line 40 to connector ground mounting surface 22 and/or filter portion 12.

Another portion of flexible transmission line such as the other end of flexible transmission line 40 is sandwiched by proximity circuit board 34. Proximity circuitry board 34 which includes coupling transmission line 39 may be electrically connected to flexible transmission line 40 via one or more vias. Further, the example of FIG. 13 varies from previous examples described herein as this example does not rely on housing 30, instead spring mechanism 26 directly biases proximity circuit board 34 in a direction at least one of perpendicular and tangential to proximity circuit board 34. For example, spring mechanism 26 biases proximity circuit board 24 toward antenna circuit board 36 such as to bring coupling transmission line 39 in close proximity to coupling transmission line 58 of antenna circuit board 36 at a predefined orientation relative to each other. In the flexible transmission line 40 configuration of FIG. 13, a portion of flexible transmission line 40 between proximity circuit board 34 and filter circuit board 24 is allowed to flex in response to movement of proximity circuit board 34. In one or more embodiments, solder mask 56 is provided/deposited between antenna circuit board 36 and proximity circuit board 34. In particular, solder mask 56 may physically separate coupling transmission line 39 of proximity circuit board 34 from coupling transmission line 58 of antenna circuit board 36 such to prevent physical electrical contact while still allowing electromagnetic coupling between transmission lines 39 and 58. While this example of the antenna system 10 may not rely on housing 30, in one or more embodiments, this example may include a housing similar to housing 30 that may be positioned under one or more boards in order to provide alignment and that is operable with the spring mechanism.

During installation and/or configuration, antenna circuit board 36 may be removably positioned on or mounted on proximity circuitry board 34 where one or more alignment elements (not shown) may be used similar to the male/female alignment elements illustrated in FIG. 3. In one or more embodiments, antenna circuit board 36 may be pressed against proximity circuit board 34 such that antenna circuit board 36 is biased to keep spring mechanism 26 under tension. Therefore, if the antenna circuit board 36 needs to be removed, antenna circuit board 36 may be moved off proximity circuit board 34, for example.

Figure 14:
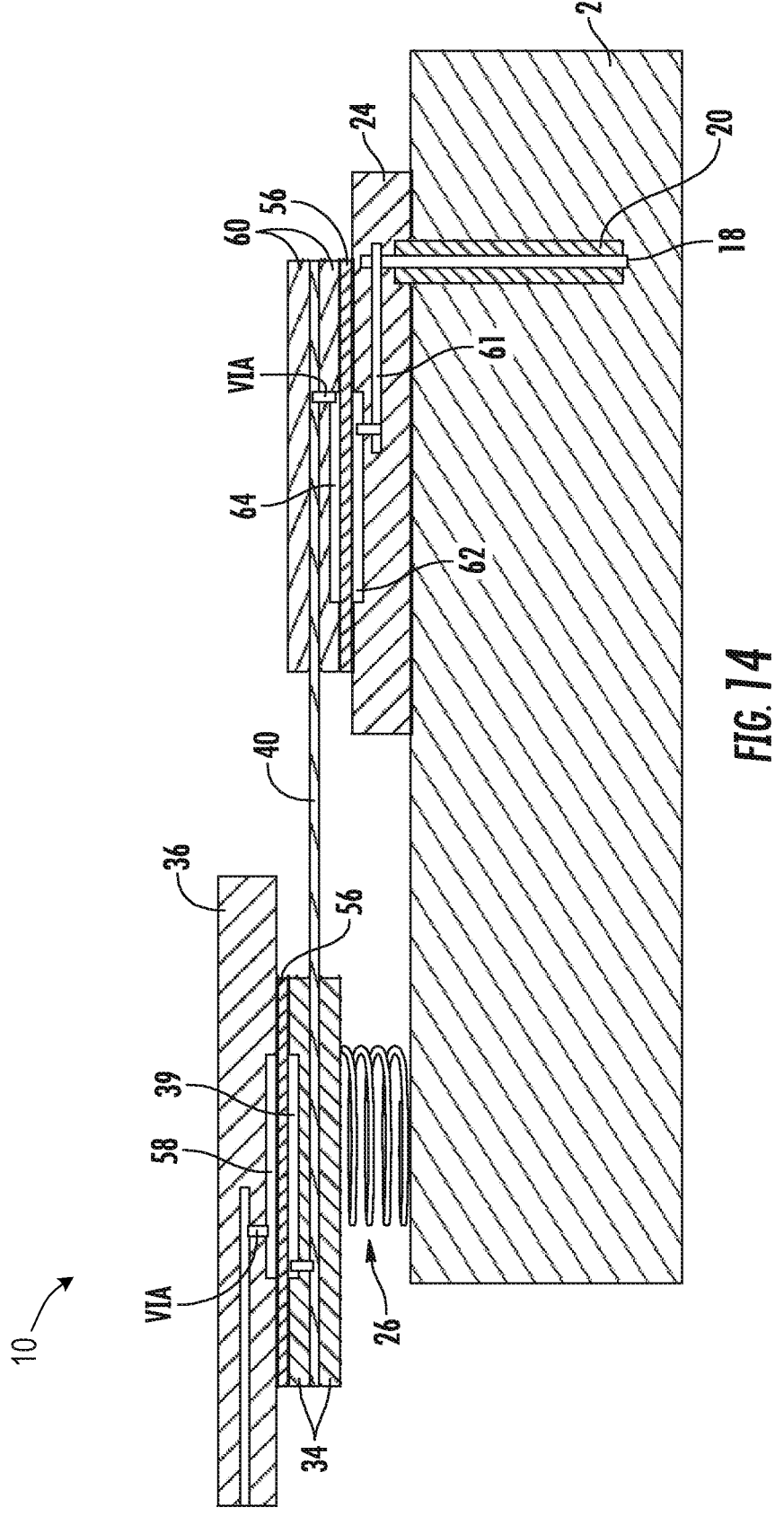
FIG. 14 is a cross-sectional view of yet another example of a portion of an antenna system according to the principles of the disclosure.

FIG. 14 is a cross-sectional view of yet another example of a portion of system 10, according to the principles of the disclosure. System 10 includes a filter portion 12, proximity RF connector 14 and an antenna portion 16. The antenna system 10 in FIG. 14 varies from the example of FIG. 13 in that proximity RF connector 14 includes a second proximity circuit board 60 for electromagnetically coupling a signal from the filter circuit board 24. In particular, the other end of flexible transmission line 40 is sandwiched by proximity circuit board 60 instead of filter circuit board 24 (which is the example in FIG. 13). Proximity circuit board 60 includes coupling transmission line 64, and is positioned on solder mask 56. In one or more embodiments, solder mask 56 is sandwiched between proximity circuit board 60 and filter circuit board 24 such that solder mask 56 physically separates proximity circuit board 60 from board 24.

Filter circuit board 24 includes coupling transmission line 62 that is configured to electromagnetically couple a signal from signal pin 18 to proximity circuit board 60. In particular, the signal from signal pin 18 is electrically communicated to coupling transmission line 62 via transmission line (i.e., PCB trace) 61 and one or more vias. For example, pin 18 may be physically and electrically connected to a transmission line 61 which is physically and electrically connected to coupling transmission line 62.

Figures 15, 16:
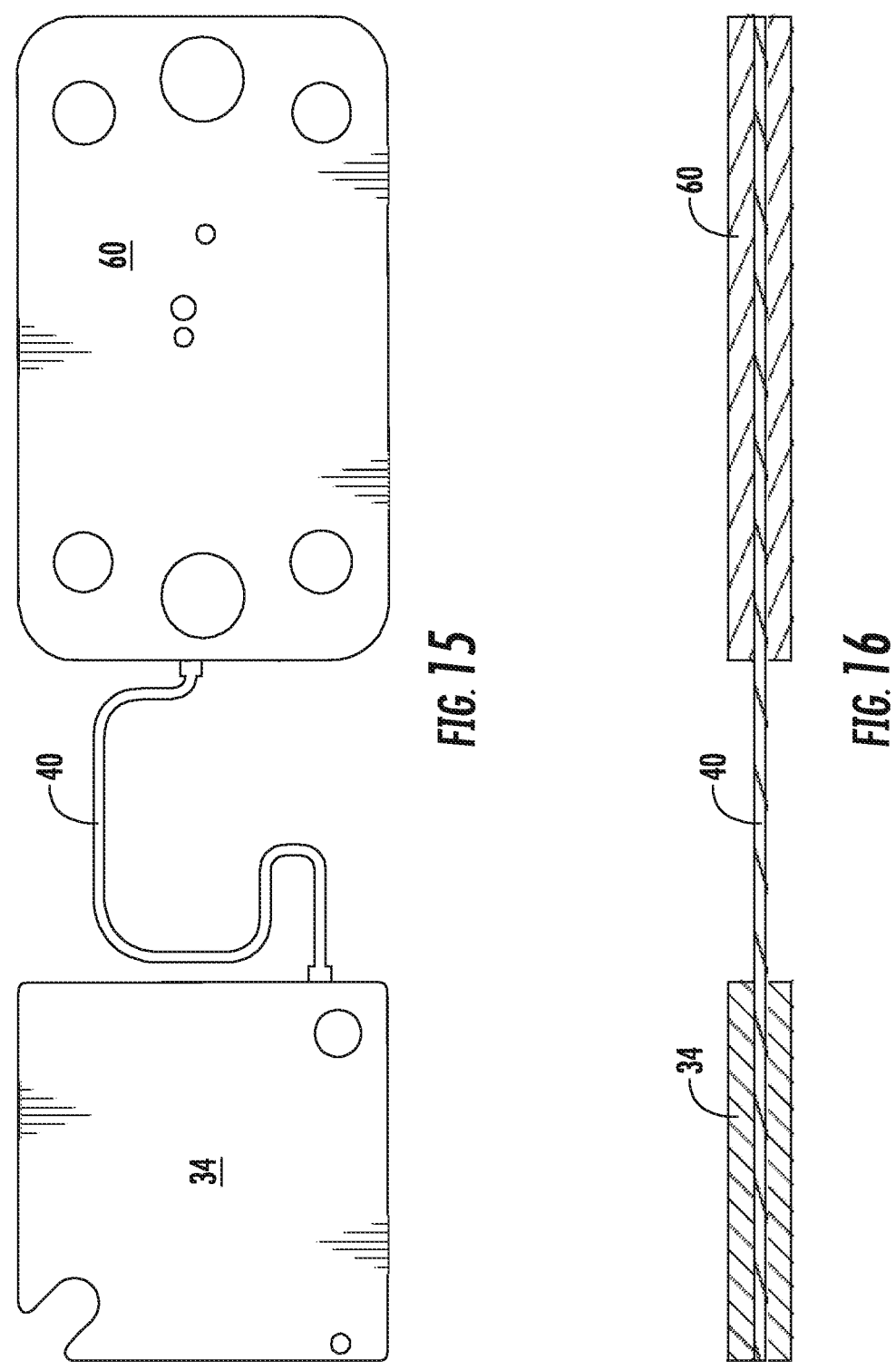
FIG. 15 is a top side view of the example of FIG. 13 according to the principles of the disclosure.
FIG. 16 is a side view of the example of FIG. 13 according to the principles of the disclosure.

FIG. 15 is a top side view of the example of FIG. 13 according to the principles of the disclosure. FIG. 16 is a side view of the example of FIG. 13, according to the principles of the disclosure.

Accordingly, one or more embodiments and/or one or more examples described herein advantageously provide a proximity RF connector 14 between an antenna portion 16 (e.g., AAS antenna) and a filter portion 12 (e.g., radio/filter). The proximity RF connector 14 is able to replace existing connector solutions such as other blind mate connectors and RF bullet. In one or more embodiments, the proximity RF connector 14 includes a spring-loaded moving part (i.e., housing 30, spring mechanism 26) having a broadside coupled transmission line signal connection and capacitively coupled ground connection and a non-moving part connected to the filter output. There is a flexible transmission line 40 between the moving part (e.g., housing) and the non-moving part (e.g., filter circuit board 24).

| Abbreviation | Explanation |
|---|---|
| AAS | Advanced Antenna Systems |
| FDD | Frequency Division Duplex |
| HRET | Hybrid remote electrical tilt |
| PIM | Passive Intermodulation |
| RET | Remote electrical |
| TDD | Time Domain Duplex |
| WCDMA | Wideband Code Division Multiple Access tilt |

As will be appreciated by one of skill in the art, the concepts described herein may be embodied as a method such as a method of manufacturing.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A proximity radio frequency connector for electromagnetically coupling a first circuit board with a second circuit board, the proximity radio frequency connector comprising:
    a housing defining an exterior mounting surface and an interior void opposite the exterior mounting surface, the housing being mountable to the second circuit board, the housing being movable in a direction at least one of perpendicular and tangential to the second circuit board; and
    a proximity circuit board mountable to the exterior mounting surface of the housing, the proximity circuit board including a coupling first transmission line for electromagnetically coupling a signal to the first circuit board when the first circuit board is proximate to, but physically separate from, the proximity circuit board.

2. The proximity radio frequency connector of claim 1, further comprising a second transmission line positioned in the interior void, the second transmission line being configured to electrically connect the second circuit board to the proximity circuit board.

3. The proximity radio frequency connector of claim 1, wherein the second transmission line is a flexible transmission line that is configured to flex in response to movement of the housing.

4. The proximity radio frequency connector of claim 3, wherein the flexible transmission line is suspended within the interior void at least in part by physically connecting the flexible transmission line to the proximity circuit board and the second circuit board.

5. The proximity radio frequency connector of claim 3, wherein the flexible transmission line comprises a signal conductor and a ground conductor.

6. The proximity radio frequency connector of claim 5, further comprising a dielectric positioned between the signal conductor and the ground conductor.

7. The proximity radio frequency connector of claim 1, further comprising a spring mechanism configured to bias the housing in the direction at least one of perpendicular and tangential to the proximity circuit board.

8. The proximity radio frequency connector of claim 7, wherein the spring mechanism includes at least one leaf spring.

9. The proximity radio frequency connector of claim 7, wherein the spring mechanism includes a plurality of spring clips that are configured to keep the spring mechanism under tension before the housing is removably pressed to the first circuit board.

10. The proximity radio frequency connector of claim 7, wherein the proximity circuit board is configured to be removably pressed against the first circuit board by the spring mechanism.

11. The proximity radio frequency connector of claim 1, wherein the housing includes at least one housing alignment element that is mateable with at least one alignment element of the first circuit board, the housing alignment element configured to position a coupling first transmission line of the proximity circuit board in a predefined orientation with respect to a third transmission line on the first circuit board.

12. The proximity radio frequency connector of claim 1, wherein the second circuit board is a filter circuit board and the first circuit board is an antenna circuit board.

13. A proximity radio frequency connector for electrically connecting a filter circuit board to an antenna circuit board of a network node, the proximity radio frequency connector comprising:

a housing defining an exterior mounting surface and an interior void opposite the exterior mounting surface, the housing being mountable to the filter circuit board, the housing being movable a direction at least one of perpendicular and tangential to the filter circuit board; and a proximity circuit board mountable to the exterior mounting surface of the housing, the proximity circuitry board including a coupling first transmission line for electromagnetically coupling a signal to the antenna circuit board when the antenna circuit board is proximate to, but physically separate from, the proximity circuit board.

14. The proximity radio frequency connector of claim 13, further comprising a second transmission line positioned in the interior void, the second transmission line being configured to electrically connect the filter circuit board to the proximity circuit board.

15. The proximity radio frequency connector of claim 13, wherein the second transmission line is a flexible transmission line that is configured to flex in response to movement of the housing.

16. The proximity radio frequency connector of claim 15, wherein the flexible transmission line is suspended within the interior void at least in part by physically connecting the flexible transmission line to the proximity circuit board and the filter circuit board.

17. The proximity radio frequency connector of claim 15, wherein the flexible transmission line comprises a signal conductor, a ground conductor and a dielectric, the dielectric being positioned between the signal conductor and the ground conductor.

18. The proximity radio frequency connector of claim 13, further comprising a spring mechanism configured to bias the housing in the direction at least one of perpendicular and tangential to the proximity circuit board.

19. The proximity radio frequency connector of claim 18, wherein the spring mechanism includes at least one leaf spring.

20. The proximity radio frequency connector of claim 18, wherein the spring mechanism includes a plurality of spring clips that are configured to keep the spring mechanism under tension before the housing is removably pressed to the antenna circuit board.

21. The proximity radio frequency connector of claim 18, wherein the proximity circuit board is configured to be removably pressed against the antenna circuit board by the spring mechanism.

22. The proximity radio frequency connector of claim 13, wherein the housing includes at least one housing alignment element that is mateable with at least one alignment element of the antenna circuit board, the housing alignment element configured to position the coupling first transmission line of the proximity circuit board in a predefined orientation with respect to a third transmission line on the antenna circuit board.

23. A proximity radio frequency connector for electromagnetically coupling a first circuit board with a second circuit board of an antenna system, the proximity radio frequency connector comprising:

a flexible transmission line at least partially suspended at least in part by a spring mechanism, the flexible transmission line configured to electrically connect a first circuit board to the second circuit board; and a first proximity circuit board including a first coupling transmission line for electromagnetically coupling a signal to the first circuit board when the first proximity circuit board is proximate to, but physically separate from, the first circuit board.

24. The proximity radio frequency connector of claim 23, wherein the spring mechanism is configured to bias the first proximity circuit board in a direction perpendicular to the first proximity circuit board.

25. The proximity radio frequency connector of claim 23, further comprising a second proximity circuitry board including a second coupling transmission line for electromagnetically coupling the signal from the second circuit board when the second proximity circuit board is proximate the second circuit board.

26. The proximity radio frequency connector of claim 23, further comprising:

a housing defining an exterior mounting surface and an interior void opposite the exterior mounting surface, the housing being mountable to a second circuit board, the housing being movable in a direction at least one of perpendicular and tangential to the second circuit board;

the first proximity circuit board mountable to the exterior mounting surface of the housing; and the flexible transmission line being suspended within the interior void at least in part by physically connecting the flexible transmission line to the first proximity circuit board and the second circuit board.

27. The proximity radio frequency connector of claim 26, wherein the flexible transmission line is configured to flex in response to movement of the housing.

28. The proximity radio frequency connector of claim 26, further comprising a spring mechanism configured to bias the housing in the direction at least one of perpendicular and tangential to the first proximity circuit board.

29. The proximity radio frequency connector of claim 28, wherein the spring mechanism includes at least one leaf spring.

30. The proximity radio frequency connector of claim 28, wherein the spring mechanism includes a plurality of spring clips that are configured to keep the spring mechanism under tension before the housing is removably pressed to the first circuit board.

31. The proximity radio frequency connector of claim 28, wherein the first proximity circuit board is configured to be removably pressed against the first circuit board by the spring mechanism.

32. The proximity radio frequency connector of claim 26, wherein the housing includes at least one housing alignment element that is mateable with at least one alignment element of the first circuit board, the housing alignment element configured to position a coupling transmission line of the first proximity circuit board in a predefined orientation with respect to a second transmission line on the first circuit board.

33. The proximity radio frequency connector of claim 23, wherein the second circuit board is a filter circuit board and the first circuit board is an antenna circuit board.

34. The proximity radio frequency connector of claim 23, wherein the flexible transmission line comprises a signal conductor, a ground conductor and a dielectric, the dielectric being positioned between the signal conductor and the ground conductor.

\*  \*  \*  \*  \*